(No Model.) 11 Sheets—Sheet 2.

J. CARPENTIER.
MECHANICAL KEY BOARD PLAYER.

No. 371,422. Patented Oct. 11, 1887.

*Fig. 1 continued.*

WITNESSES:
John F. Rennie
Wm. H. Hannam

INVENTOR:
Jules Carpentier,
By his Attorneys,
Arthur E. Fraser & Co.

(No Model.) 11 Sheets—Sheet 3.

J. CARPENTIER.
MECHANICAL KEY BOARD PLAYER.

No. 371,422. Patented Oct. 11, 1887.

Fig. 2

WITNESSES:
John A. Rennie
Wm. H. Hannam

INVENTOR:
Jules Carpentier
By his Attorneys,
Arthur E. Fraser & Co.

(No Model.) 11 Sheets—Sheet 4.

J. CARPENTIER.
MECHANICAL KEY BOARD PLAYER.

No. 371,422. Patented Oct. 11, 1887.

WITNESSES:
John A. Rennie,
Wm. H. Hannam.

INVENTOR:
Jules Carpentier,
By his Attorneys,
Arthur E. Brown & Co.

(No Model.) 11 Sheets—Sheet 5.

J. CARPENTIER.
MECHANICAL KEY BOARD PLAYER.

No. 371,422. Patented Oct. 11, 1887.

WITNESSES:
John A. Rennie.
Wm H. Hannam.

INVENTOR:
Jules Carpentier
By his Attorney
Arthur C. Fraser &Co (No Model.) 11 Sheets—Sheet 6.

J. CARPENTIER.
MECHANICAL KEY BOARD PLAYER.

No. 371,422. Patented Oct. 11, 1887.

Fig. 4

WITNESSES:
John A. Rennie
Wm. H. Hannam

INVENTOR:
Jules Carpentier,
By his Attorneys,
Arthur G. Fraser & Co.

(No Model.) 11 Sheets—Sheet 7.

J. CARPENTIER.
MECHANICAL KEY BOARD PLAYER.

No. 371,422. Patented Oct. 11, 1887.

(No Model.) 11 Sheets—Sheet 9.

J. CARPENTIER.
MECHANICAL KEY BOARD PLAYER.

No. 371,422. Patented Oct. 11, 1887.

WITNESSES:

INVENTOR:
Jules Carpentier,
By his Attorneys, (No Model.) 11 Sheets—Sheet 11.

J. CARPENTIER.
MECHANICAL KEY BOARD PLAYER.

No. 371,422. Patented Oct. 11, 1887.

WITNESSES:
John L. Kinnid
Wm N. Hannam

INVENTOR:
Jules Carpentier,
By his Attorneys,
Arthur C. Fraser & Co.

UNITED STATES PATENT OFFICE.

JULES CARPENTIER, OF PARIS, FRANCE.

MECHANICAL KEY-BOARD PLAYER.

SPECIFICATION forming part of Letters Patent No. 371,422, dated October 11, 1887.

Application filed May 28, 1887. Serial No. 239,655. (No model.) Patented in France October 31, 1884, No. 165.133; in England June 10, 1885, No. 7,096; in Belgium June 12, 1885, No. 69,244; in Germany June 23, 1885, No. 34,191, and in Austria-Hungary October 27, 1885, No. 24,869 and No. 51,022.

*To all whom it may concern:*

Be it known that I, JULES CARPENTIER, a citizen of the French Republic, residing in Paris, France, have invented certain new and useful Improvements in Apparatus for Mechanically Playing Keyed Musical Instruments, of which the following is a specification.

This invention is the subject of a patent in France, dated October 31, 1884, No. 165,133; in England, dated June 10, 1885, No. 7,096; in Belgium, dated June 12, 1885, No. 69,244; in Germany, dated June 23, 1885, No. 34,191, and in Austria-Hungary, dated September 27, 1885, No. 24,869 and No. 51,022.

My invention provides an apparatus which I call a "melotrope," for actuating a piano, organ, or any other keyed instrument according to the perforations in a prepared band of paper. This apparatus, on being mounted over the key-board of the piano or other instrument and rotated by means of a crank or otherwise, depresses the keys of the instrument automatically and in the order and time determined by the perforations in the band of paper.

My improved apparatus for this purpose operates on the principle of the pressing down or displacement of moving parts, which correspond in position to the keys of the instrument which is to be actuated, by means of the friction of a cord or band against a continuously-rotated part, upon the cord or band being engaged with or disengaged from said rotating part by mechanism under the control of the perforations in the prepared band of paper. By this means the keys are depressed with a sufficient force derived from the rotating part and entirely independent of the force exerted by the perforated paper in its passage through the apparatus.

My melotrope includes two essential parts—the one which I call the "servo-motor" is designed to transmit to the different keys of the instrument the pressure transmitted to the crank or other source of power, and the other, which I call the "reader," is acted upon by the band of perforated paper, and serves to throw into and out of gear with the rotating cylinder the cords which put in motion the several plungers by which the keys of the instrument are depressed.

The accompanying drawings represent a melotrope designed for thirty-seven notes.

Referring first to Figs. 1 to 5, let A designate the driving shaft, which is rotated by a crank or other motor; B, a rotary cylinder extending longitudinally of the apparatus, and C and D bevel-wheels fixed on the respective shafts by which the cylinder B is driven from the shaft A.

The cylinder B is formed with as many peripheral grooves $a$ $a$, having their sides slightly coned, as there are notes to be played by the apparatus. In each groove $a$ is arranged a cord, $b$, which makes two or three turns around it, and one end of which is fixed to a pusher-bar or plunger, E, while its other end is fixed by means of a little clamp-screw, $c$, to a wooden sector, F. By turning the screw $c$ the cord may be adjusted to the proper tension. The several plungers E E are spaced apart to the same width as the keys of the piano to be played upon, and their ends project down and are normally in contact with the keys.

The sector F is fulcrumed at the end of a vertical arm of an elbow-lever, G, which is pivoted at $f$ and the horizontal arm of which terminates in a flat head, $d$, and is kept pressed upward by a little spring, $e$. The curved portion of the sector F projects slightly within the groove $a$, but does not touch the sides thereof when in repose.

Figure 2:
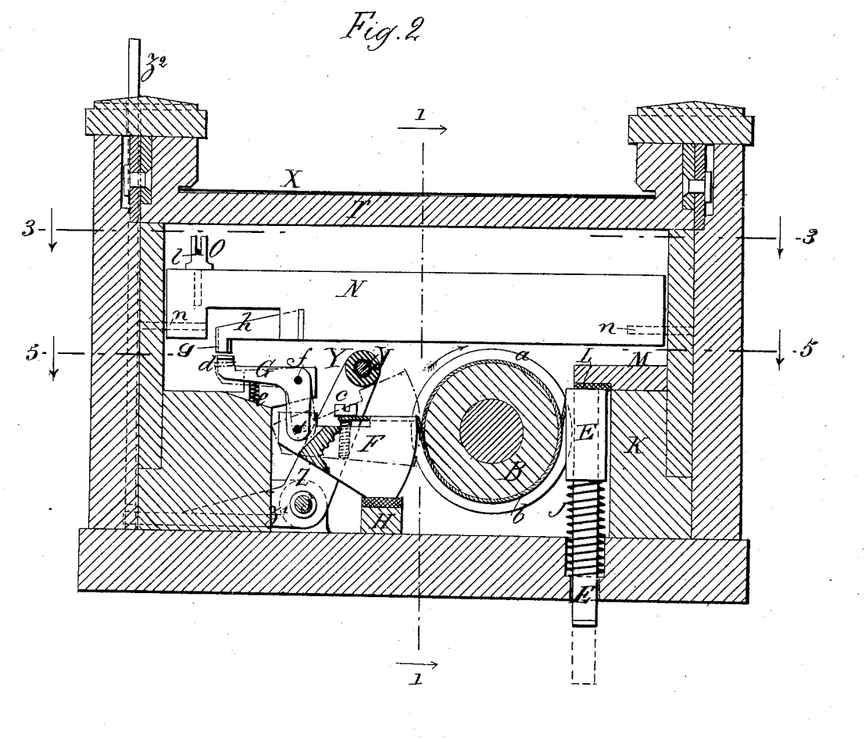
Fig. 2 is a vertical transverse section thereof cut in the plane of the line 2 2 in Figs. 1 and 5.

It is apparent that if, while the cylinder B is rotating in the direction of the arrow in Fig. 2, the elbow-lever G be pressed down, the movement of the lower arm thereof around the pivot $f$ will thrust the sector F toward the cylinder and into the groove $a$, and that the sector will be engaged by the conical sides of the groove, and by the rotary movement of the cylinder it will be lifted to the position shown in dotted lines. It will thus pull the cord $b$ and draw the latter into frictional contact with the cylinder B, and will thereby draw down the plunger E, which will strike one of the keys of the piano and press it down. When the key is fully depressed, it will be so held by the friction of the cord $b$ against the cylinder B, which will continue as long as the sector F remains thrust against the groove $a$ in the cylinder. Upon releasing the elbow-lever G its spring $e$ will press it up, thereby retracting the sector F, whereupon the latter will fall upon the cushion H, and the cord $b$, being thus slackened, will relax its frictional contact with the cylinder B, and the plunger E will reascend under the tension of the spring J.

All the plungers E E are guided by vertical grooves formed in a bar, K, at the top of which is a strip, M, having a cushion-facing, L, of felt, extending its entire length, which prevents all noise resulting from the shock of the plungers as they ascend.

Figure 1:
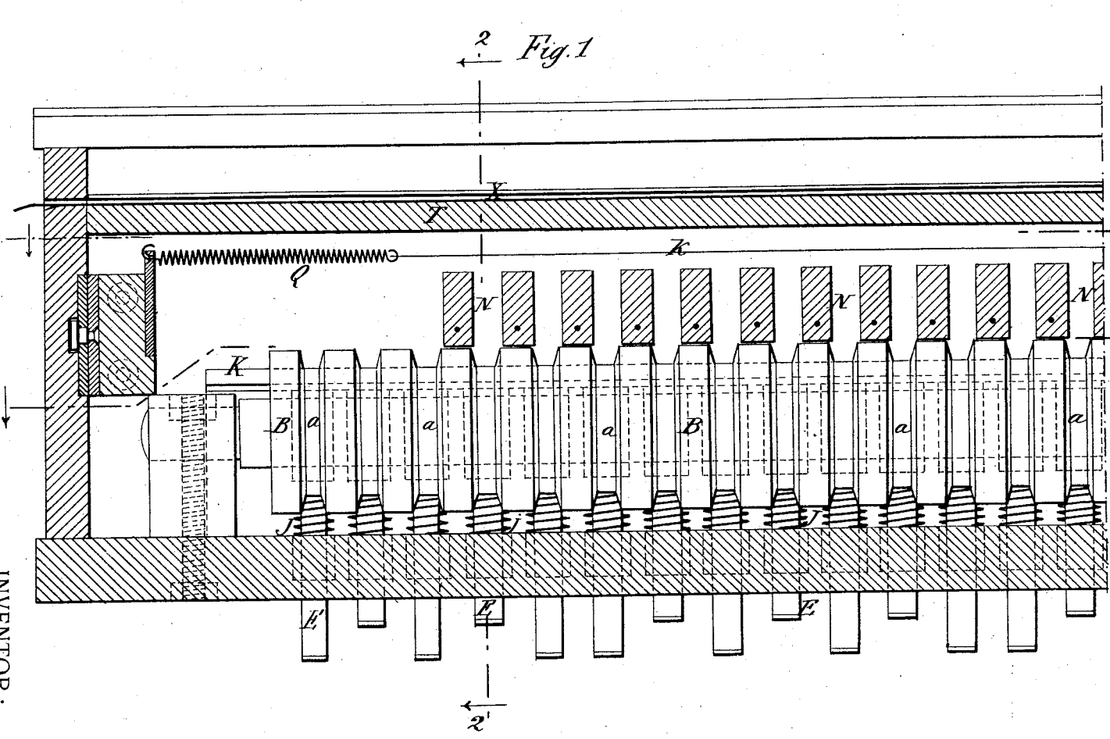
Figure 1 is a longitudinal vertical section thereof cut in the plane of the lines 1 1 in Figs. 2 and 4.
Figure 3:
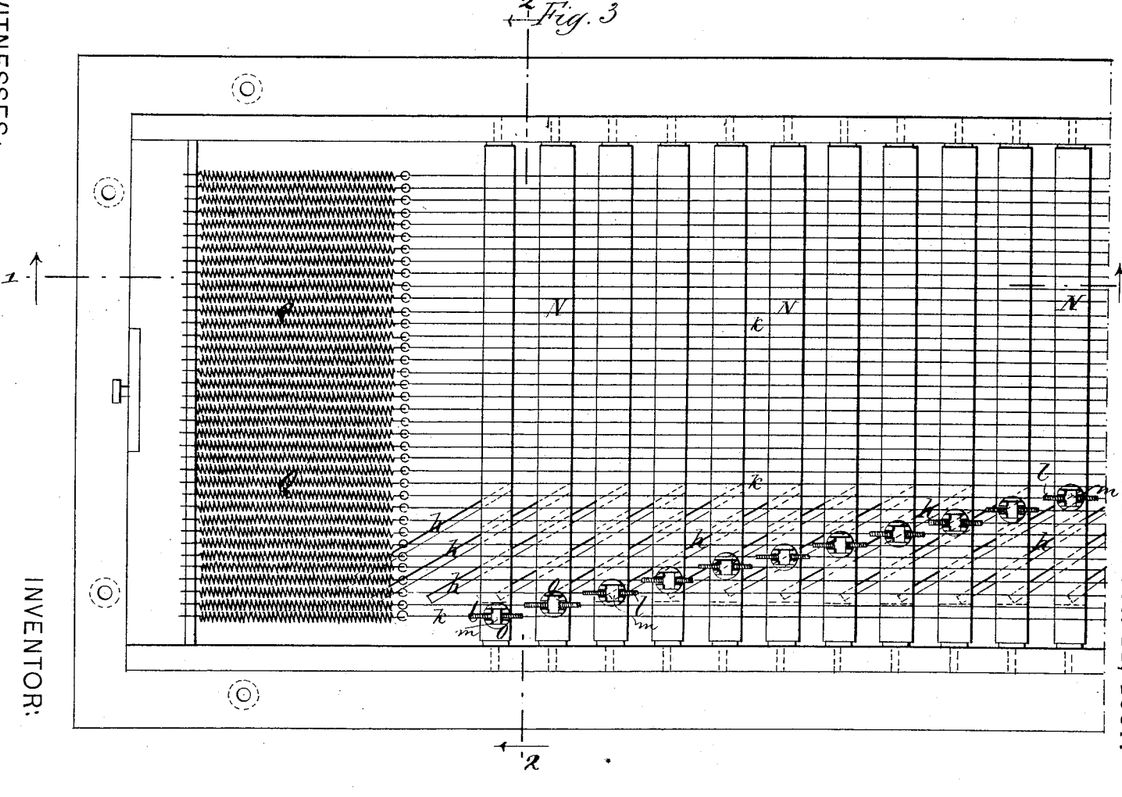
Fig. 3 is a plan with the cover removed.
Figure 4:
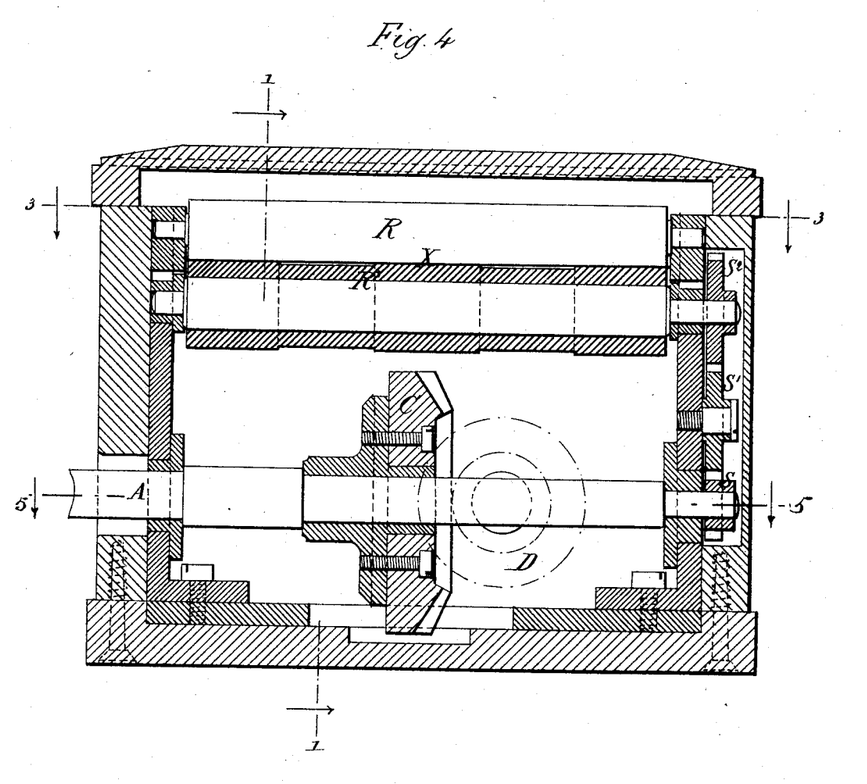
Fig. 4 is a transverse section cut in the plane of the line 4 4 in Fig. 1.
Figure 5:
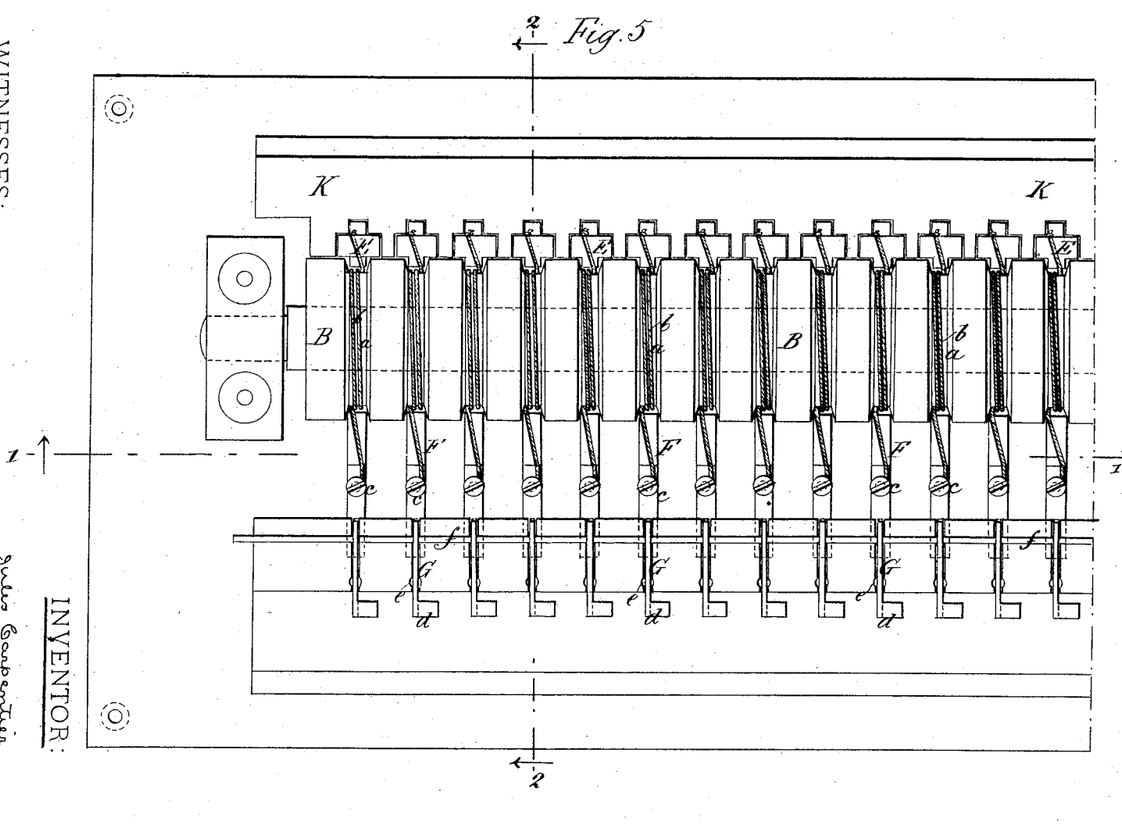
Fig. 5 is a plan of the servo motor in place on the bottom of the inclosing case, the sides of the latter having been removed.

Above the parts thus far described is arranged a series of oscillating bars or levers, N N, pivoted on axes $n$ $n$ in Fig. 2. Each bar N has an arm, $h$, fastened to it and projecting obliquely to one side, as shown in Figs. 2 and 3. The arms $h$ terminate in downwardly-projecting toes $g$, which stand immediately over the respective heads $d$ $d$ of the elbow-levers G G. Thus the tilting of either lever N to the left in Fig. 1 acts to press down the corresponding elbow-lever G and consequently to depress the corresponding plunger E through the medium of the sector F and cord $b$, as already described. Each lever N has a fork, O, fastened to its upper side, the forks of the several levers being arranged in different positions, as shown in Fig. 3. Immediately over the series of levers N N are strung connecting-wires $k$ $k$, which are stretched by springs Q Q at one end, and at their other ends they are attached, after the manner shown in Fig. 1, to a series of feeler-levers, P P, which constitute the reader, and which are as many in number as the notes to be played. Each one of the wires $k$ is connected to the fork O of its corresponding lever N, in any suitable manner. The connection shown consists of a threaded sleeve, $l$, slipped over and united to the wire and passing through the fork O, and a nut, $m$, screwing on this sleeve and embraced by the fork O, as best shown in Fig. 1. By means of this construction the lever N can be adjusted relatively to the wire $k$, in order to bring its oblique arm $h$ into the proper position relatively to the elbow-lever G and to reduce its movement to that strictly necessary for actuating the apparatus. The band of strong paper or card-board X, formed with suitable perforations, is drawn across the ends of fingers $p$ of the series of feeler levers P, which are pressed upward against it by the tension of the springs Q Q. So long as the fingers $p$ bear against an unperforated portion of the paper band they are held depressed thereby, and all the springs Q Q are kept distended, and the oscillating levers N N remain in their normal positions, as shown in Fig. 1; but when any finger $p$ encounters a perforation in the paper it is pressed up into it by the tension of its spring, thereby slackening its wire $k$ and permitting the spring Q to draw the latter to the left, and thereby to tilt the corresponding lever N, and consequently to actuate the elbow-lever G in connection therewith, with the result of pressing down the corresponding plunger E. Thus, whenever a perforation in the band of paper corresponding in position to any note encounters the finger $p$, the plunger E answering to that finger is thrown down, and the key of the instrument which plays the corresponding note is depressed. The tension of the springs Q Q should be just sufficient to tilt the levers N N with sufficient force to insure the proper engagement of the servo-motor devices.

The band of perforated paper or card-board X passes over the board T, which covers the entire apparatus, and is drawn along by two rollers, R and R', of which the former is of metal, and is pressed toward the latter by two flat springs, R², which press down on its bearings. The lower roller, R', which is covered with rubber, is put in motion by a crank, which turns the shaft A through the medium of toothed wheels S, S', and S², of which the first is fixed on the shaft A and the last on the axis of the roller R'. The perforated band X, after traversing the cover T, passes under a roller, U, which is formed with as many peripheral grooves $n$ $n$ as there are feeler levers P P, and corresponding in position with the fingers $p$ $p$ of the latter and with the longitudinal rows of perforations in the band. The fingers $p$ $p$ enter the respective grooves $m$ $m$ whenever the perforations in the paper band permit them to rise.

In order to introduce the band of paper into the apparatus, it is necessary to press down all of the levers P P, which would otherwise unitedly obstruct the entrance of the paper. For this purpose I provide an oscillatory cam, $e$, Fig. 1, which is turned by means of a knob, $e'$, Fig. 3, at the front of the machine.

Whenever the perforated band in its movement presents an unperforated portion to any one of the fingers $p$, the latter is depressed and the lever P consequently pulls the wire $k$, to which it is attached, thereby distending the spring Q and tilting the oscillating lever N, the fork O of which is connected to this wire to the right, thereby relieving the corresponding elbow-lever, G, of pressure and retracting the sector F, attached thereto, and as a necessary consequence disengaging the cord $d$ and permitting the plunger E to ascend to its normal position. The opposite action results whenever a perforation in the moving band passes over the finger $p$, as already described. Thus it will be understood that the keys of the instrument are depressed by the respective plungers E E in the same order and succession in which the perforations in the band of paper encounter the respective fingers $p\ p$, and that each key remains depressed for a period of time proportional to the length of the perforation or slot in the paper which determines its depression.

The distance to which the plungers E E descend is limited by means of a buffer, Y, arranged over the sectors F F and against which they strike, as best shown in Fig. 2. This buffer consists of a rubber tube, $y$, mounted on a pin. The opposite ends of this pin or rod are fixed to the ends of elbow-levers Z Z, which are pivoted on a rod, $z$, and the horizontal arm $z'$ of one of these levers is connected to a rod or lever, $z^2$, by means of which the levers Z Z may be tilted. In this manner the buffer Y may be raised or lowered at will, thereby regulating the extent of depression of the keys, and consequently controlling the expression of the music being played. In this manner the expression may be controlled at will by a manipulation of the lever $z^2$; or means may readily be devised for operating this lever automatically by means of the prepared band of paper.

It will be understood that the buffer Y may be raised or lowered in other ways than by the means shown, and that these will come equally within the scope of my invention. Furthermore, in order to greatly vary the effects of expression, the buffer Y may be subdivided into any desired number of parts, and each of its subdivisions may be actuated independently of the others, in order to determine the extent of the depression of the group of keys which it controls.

Figures 6, 7:
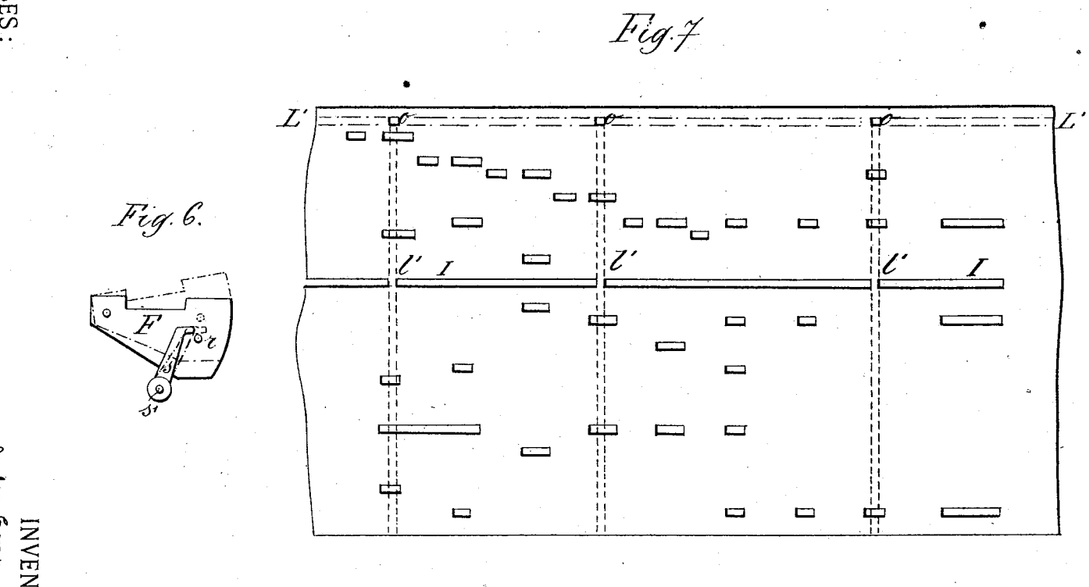
Fig. 6 is a detail view looking in the same direction as Fig. 2.
Fig. 7 is a plan of the perforated band of paper.

It is obvious that to produce a note which is to be held for a considerable time the perforation or slit in the band of paper must be correspondingly long; but if slits of undue length be cut in the paper the latter is weakened and is liable to be injured in handling. In order to remedy this inconvenience I have devised the following method: Whenever a long slit is cut in the band of paper, it is interrupted or consolidated at intervals by transverse tongues left uncut in the paper. These interruptions, however, would result in corresponding interruptions in the note played by the instrument were not some special means provided for preventing this effect. To this end I have devised means for holding the note during the passage of these transverse tongues over the fingers $p\ p$. Each sector F carries a pin, $r$, projecting from its side, as shown in Fig. 6. Between the respective sectors is arranged a series of little levers, $s$, all carried by the same spindle, $s'$, and moved all together by a supplementary sector, which is controlled in the same manner as all the others through the medium of a special feeler-lever, P. The finger $p$ of this lever is arranged in the plane of a supplementary line of perforations, L' L', in Fig. 7, which shows a portion of the perforated band of paper. In this supplementary line L' perforations $o\ o$ are formed in line with the transverse tongues $l'\ l'$, by which the long slit I is interrupted to re-enforce the paper. The perforations $o$ are of a length at least equal to that of the tongues $l'$. Whenever an opening $o$ encounters the finger $p$ of the supplementary feeler-lever, the little levers $s\ s$ are displaced, as shown in dotted lines in Fig. 6, so that the hooked end of each lever stands in the way of the pin $r$ on the corresponding sector. If any one of the sectors is raised, the lever $s$ thus acts to prevent its falling, and consequently holds the key which corresponds to this sector depressed. By the time the lever $s$ is released and moves back to its normal position the sector F will, if its note is still to be held, be again acted upon by its own feeler-lever, since the tongue $l'$ will have passed over the finger $p$ of the latter. Thus the note is held during the time that the tongue $l'$ is passing over the finger. The levers $s$ are so shaped and mounted that they do not interfere with the raising of any sector F which was depressed before the displacement of the lever $s$.

By reason of its narrowness my melotrope may be put over the key-board of a piano.

I will now describe the means which I employ for maintaining it in position.

Figure 8:
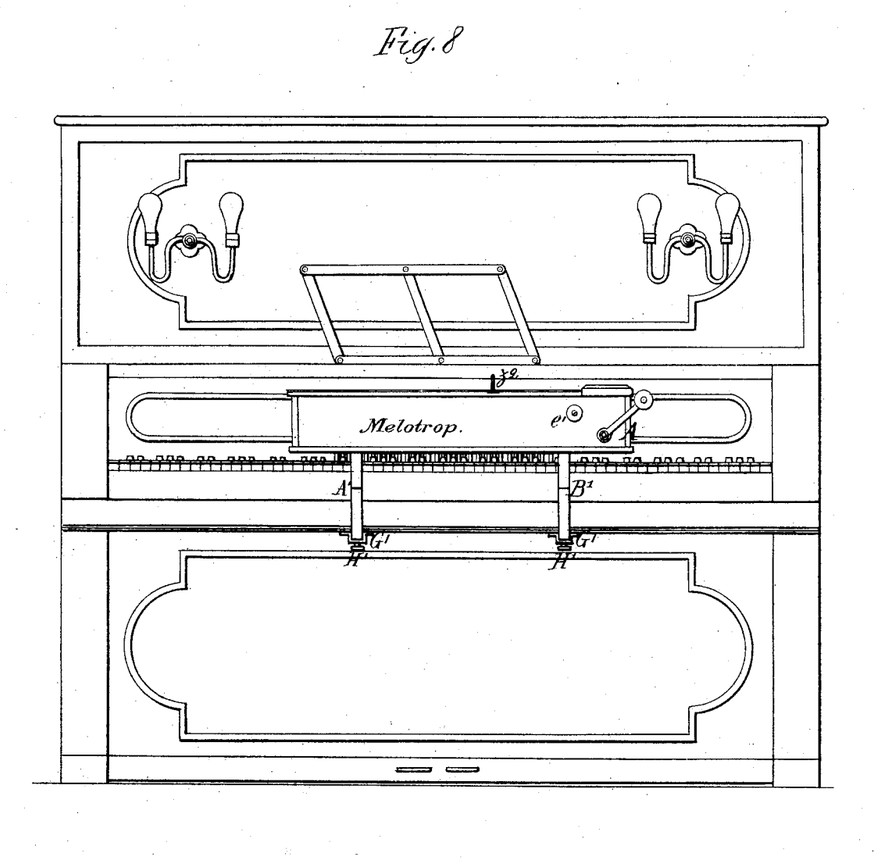
Fig. 8 is a front elevation of an upright piano or organ to which my invention is applied.
Figure 9:
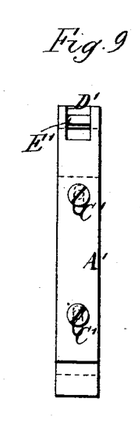
Figs. 9 to 16, inclusive, are detail views illustrating the means for mounting the melotrope on the piano or organ.
Figures 10, 12:
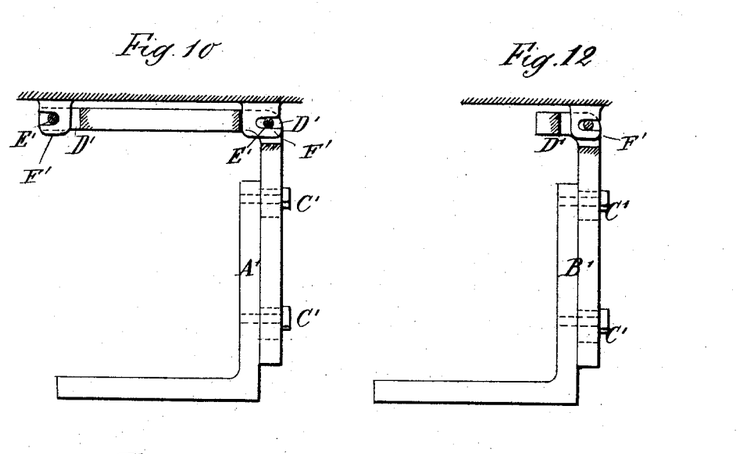
Figure 11:
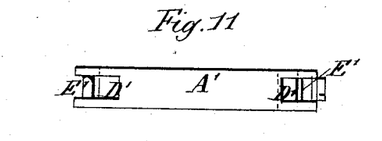
Figure 13:
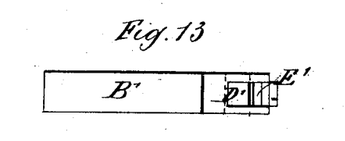

Fig. 8 shows an upright piano to which my melotrope has been applied. The latter is supported by two elbows, A' and B'. The former is shown in Figs. 9, 10, and 11, of which Fig. 9 is a front view, Fig. 10 a side view, and Fig. 11 a plan. The elbow B' is shown in side view in Fig. 12 and in plan in Fig. 13. The elbows A' B' consist each of two parts, the lower part of which is stationary and the upper of which is adjustable up or down upon the lower part and is fastened at any suitable height by means of set-screws C' C'. The upper arm of the elbow A' is formed with two openings, D' D', in which are pins E' E', which engage hooks F' F', fixed on the bottom of the melotrope. The other elbow, B', has but a single opening, D', and a single pin, E', which engages a hook, F', fixed under the melotrope. The apparatus is thus sustained at three points.

Figure 14:
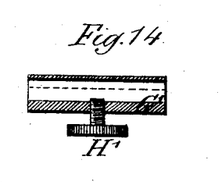
Figure 15:
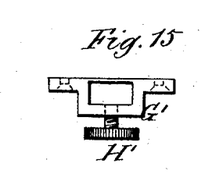
Figure 16:
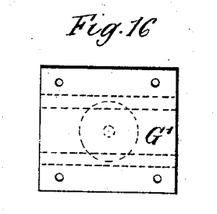

The horizontal arms of the lower or fixed part of the elbows are placed in sockets G', fixed permanently under the key-board of the piano. They are shown in longitudinal section in Fig. 14, in front view in Fig. 15, and in plan in Fig. 16. Each socket is provided with a set-screw, H', by which the elbow may be fixed in any convenient position, so that the plungers of the melotrope may be adjusted to the proper position on the keys of the piano. The adjustment by which the plungers are brought to the proper height relatively to the keys is effected by moving the movable upper portion of the elbows A' B' up or down and setting them by the screws C'.

It will be understood that the several elements employed by my invention may be substituted by equivalents possessing substantially similar functions. For example, the so-called "plungers" E E may be substituted by any other moving parts which are capable of receiving motion from the cords d d and of acting to depress the keys of the instrument. It will also be understood that it is not essential that my melotrope be actuated by a perforated band of paper, as it might instead be actuated by a traveling band having cam projections, or by a cam-cylinder, or by any other means heretofore employed for operating mechanical musical instruments.

What I claim as my invention, and desire to secure by Letters Patent, is, in an apparatus for mechanically playing keyed musical instruments, the following defined novel features and combinations, substantially as hereinbefore specified, namely:

1. In a melotrope, or mechanical key-board player, the combination of plungers or equivalent moving parts for depressing the keys of the instrument, a rotary cylinder, a series of cords each connected at one end to the corresponding one of said plungers, encircling said cylinder and connected at its other end to the corresponding one of a series of moving parts, the said moving parts adapted on being displaced to pull said cords taut and thereby draw them into frictional contact with the rotating cylinder, whereby they are wound up and caused to depress said plungers, and automatic means adapted to be controlled by a perforated band (or equivalent) for displacing said moving parts, and thereby effecting the frictional engagement and disengagement of the respective cords.

2. In a melotrope, or mechanical key-board player, the combination of plungers or equivalent moving parts for depressing the keys of the instrument, a rotary cylinder having peripheral grooves, a series of cords connected at one end to the respective plungers and encircling said cylinder in the grooves thereof, a series of moving parts connected to the opposite ends of said cords and adapted, on being displaced, to pull said cords taut and thereby draw them into frictional contact with said grooves, and automatic means for displacing and releasing said moving parts and thereby effecting the frictional engagement and disengagement of the respective cords with said cylinder.

3. In a melotrope, or mechanical key-board player, the combination of plungers for depressing the keys of the instrument, a rotary cylinder, a series of cords connected to the respective plungers and encircling said cylinder, a series of sectors adapted to make frictional contact with said cylinder and to be oscillated thereby and connected to the respective cords, whereby, on being so oscillated, they pull said cords into frictional engagement with the cylinder, and means for automatically moving said sectors into and out of frictional contact with said cylinder.

4. In a melotrope, or mechanical key-board player, the combination of a series of vertical plungers for depressing the keys of the instrument, guides in which said plungers may move vertically, springs for pressing up said plungers, a rotary cylinder, a series of cords connected at their ends to the respective plungers and extending thence downward and encircling said cylinder, a series of moving parts for drawing the cords into frictional contact with the cylinder, whereby the cords are pulled thereby and the corresponding plungers are drawn down to depress the keys, and automatic means for actuating said moving part.

5. The combination of plungers for depressing the keys of the instrument, a rotary cylinder having peripheral grooves with conical sides, a series of cords connected to the respective plungers and encircling said cylinder in the grooves thereof, a series of sectors connected to the respective cords and adapted to enter the respective grooves and make frictional contact with the conical sides thereof, and means for automatically moving said sectors into frictional contact therewith and for retracting them therefrom.

6. The combination of plungers for depressing the keys of the instrument, a rotary cylinder having peripheral grooves, cords connected to the respective plungers and encircling said cylinder, sectors connected to the respective cords and adapted to make frictional contact with said cylinder, elbow-levers to which said sectors are pivoted and by the movement of which the sectors are thrown into and out of frictional contact with said cylinder, and automatic means for depressing and releasing said elbow-levers.

7. In a melotrope, or mechanical key-board player to be actuated by a band of perforated paper, the combination of a series of feeler-levers having their ends or fingers arranged to bear against the paper in line with the rows of perforations therein, wires connected to the respective levers, springs arranged to distend the several wires, a series of tilting levers connected to the respective wires and arranged to be tilted thereby upon the pulling of the wires by the feeler-levers, a series of plungers for depressing the keys of the instrument, and mechanism interposed between said tilting levers and said plungers, adapted to depress the latter upon the tilting of said levers.

8. In a melotrope, or mechanical key-board player to be actuated by a band of perforated paper, the combination of a series of feeler-levers, wires connected to the respective levers, springs arranged to distend the several wires, a series of tilting levers connected to the respective wires, adjusting devices at the connections between said tilting levers and wires, a series of plungers for depressing the keys of the instrument, and mechanism interposed between said tilting levers and said plungers, adapted to depress the latter upon the tilting of said levers.

9. In a melotrope, or mechanical key-board player to be actuated by a band of perforated paper, the combination of a series of feeler-levers, a series of wires connected to the respective levers, springs arranged to distend the several wires, a series of tilting levers arranged beneath said wires, with their pivotal axes extending transversely thereto and having forks for engaging the respective wires, a series of plungers for depressing the keys of the instrument, and mechanism interposed between said tilting levers and said plungers, respectively, and adapted to depress the plungers upon the tilting of the corresponding levers.

10. In a melotrope, or mechanical key-board player to be actuated by a band of perforated paper, the combination of feeler-levers P P, wires k k, connected to the respective levers, springs Q Q for stretching the several wires, a series of tilting levers, N N, consisting of bars arranged beneath said wires and extending transversely thereof, and having laterally-projecting arms h h and forks O O for engaging the respective wires, with screws l, fastened on the wires at the points where they pass through said forks, and nuts m on said screws and engaged by said forks, whereby the connection of said tilting levers with said wires may be adjusted.

11. In a melotrope, or mechanical key-board player, the combination of a feeler-lever, P, wire k, connected thereto, spring Q, arranged to distend said wire, tilting lever N, connected to said wire and having arm h, elbow-lever G, adapted to be tilted by the depression of said arm h, sector F, pivoted to said elbow-lever and adapted to be advanced or retracted by the movement thereof, rotary cylinder B, plunger E, cord b, connected to said plunger, at one end encircling said cylinder and connected at the other end to said sector, and retracting-spring J for said plunger.

12. In a melotrope, or mechanical key-board player having plungers or equivalent moving parts for depressing the keys of the instrument, a rotary cylinder through which the power is transmitted, and cords connected to the respective plungers and encircling said cylinder, the combination therewith of moving parts for drawing said cords into frictional engagement with said cylinder, and a buffer or stop for limiting the movement of said parts and thereby determining the extent of depression of said plungers.

13. In a melotrope, or mechanical key-board player, the combination, with plungers for depressing the keys of the instrument, a rotary cylinder, a series of cords connected to the respective plungers and encircling said cylinder, a series of moving parts connected to the respective cords and adapted to draw them into frictional engagement with said cylinder, and a buffer or stop for limiting the movement of said parts and adjustable to different positions in order to vary the extent of depression of the plungers and thereby to determine the expression of the music being played.

14. In a melotrope, or mechanical key-board player to be actuated by a band of perforated paper, the long perforations or slits in which are re-enforced at intervals by interrupting-tongues, the combination, with the series of plungers for actuating the keys, the series of feeler-levers to be actuated by the perforations in the band of paper, and mechanism intervening between said levers and plungers for depressing the latter upon the displacement of the former and maintaining them depressed during such displacement, of a supplemental feeler-lever and a stop device actuated thereby and adapted to prevent the retraction of the depressed plungers during its displacement and thereby to avoid interruption of the notes during the passage of said tongues over the feeler-levers.

15. In a melotrope, or mechanical key-board player to be actuated by a band of perforated paper, the long perforations or slits in which are re-enforced at intervals by interrupting-tongues, the combination, with the series of plungers for actuating the keys, a rotary cylinder, a series of cords connected to the respective plungers and encircling said cylinders, a series of sectors connected to the respective cords, the series of feeler-levers to be actuated by the perforations in the band of paper, and mechanism intervening between said levers and sectors for displacing the latter upon the displacement of the former, of stop-levers s, adapted when displaced to prevent the return of such sectors to their normal position, and a supplemental feeler-lever connected to and actuating such stop-lever.

16. The combination, with a melotrope, or mechanical key-board player, of a supporting-frame for attaching it to the key-board of an instrument, consisting of elbows made each in two parts, the one vertically adjustable upon the other, and one of said parts connected to the melotrope and the other to the instrument-case.

17. The combination, with a melotrope, or mechanical key-board player, of a supporting-frame for attaching it to the key-board of an instrument, consisting of sockets G' and elbows A' and B', said elbows having horizontal arms entering said sockets and constructed in two parts, the one vertically adjustable upon the other.

In witness whereof I have hereunto signed my name in the presence of two subscribing witnesses.

JULES CARPENTIER.

Witnesses:
ROBT. M. HOOPER,
AMAND RITTER.